| United States Patent [19] | [11] Patent Number: 4,518,234 |
|---|---|
| Lamére | [45] Date of Patent: May 21, 1985 |

[54] METHOD AND APPARATUS FOR REPRODUCING AT LEAST ONE COLORED SURFACE

[76] Inventor: Jean-Claude Lamére, Villaret, 1411 Esserttines sur Yverdon, Switzerland

[21] Appl. No.: 556,432

[22] Filed: Nov. 30, 1983

[30] Foreign Application Priority Data

Jan. 10, 1983 [CH] Switzerland ............... 109/83

[51] Int. Cl.³ .................. G03B 27/00; G03B 41/00
[52] U.S. Cl. .......................... 354/20; 355/38; 356/443
[58] Field of Search ............ 354/4, 20; 364/526; 356/404, 443, 444; 346/107 R; 355/38, 68

[56] References Cited

U.S. PATENT DOCUMENTS

| 2,457,746 | 12/1948 | Sweet | 354/20 |
|---|---|---|---|
| 3,636,851 | 1/1972 | Fürst | 354/20 |
| 3,700,335 | 10/1972 | Seelbinder | 356/444 X |
| 4,101,216 | 7/1978 | Grossman | 356/444 X |
| 4,150,894 | 4/1979 | Meyer et al. | 356/404 X |
| 4,249,807 | 2/1981 | Webster et al. | 354/4 |

Primary Examiner—William B. Perkey
Attorney, Agent, or Firm—Hayes Davis & Soloway

[57] ABSTRACT

The method for reproducing at least one colored surface the color of which corresponds to a reference chosen from a color chart is characterized by the fact that during a first stage, there is recorded on a photographic emulsion of the same type a sensitogram developed by means of developing materials of predetermined characteristics, a densitometric analysis of said developed sensitogram is made and the results of said analysis recorded so as to establish an analytical record of the colors comprising the sensitometer with respect to the photographic emulsion and the developing products used. During a second stage, the exposure conditions for the photographic emulsion are determined to reproduce the color chosen from the color chart as a function of the information registered on the analytical record of the colors of the sensitogram. The apparatus used in this process comprises essentially an exposure unit (11), a sensitometer (16) and a central control unit (22).

11 Claims, 2 Drawing Figures

METHOD AND APPARATUS FOR REPRODUCING AT LEAST ONE COLORED SURFACE

The present invention concerns a method for reproducing at least one colored surface, the color of which corresponds to a reference chosen from a color chart, said colored surface being obtained by controlled synthesis of colors on a given photographic emulsion.

It further concerns an apparatus for putting this method to use.

In the graphic arts and particularly in the advertising field, it is often necessary to reproduce one or more colored surfaces, the colors being chosen from a color chart at the client's disposal. Until now, these color charts have been made by classic printing methods, as a result of which the colored surface made on a photographic emulsion did not necessarily correspond to the color selected from the chart. Furthermore, it is known that the color of a photographic document depends on both the emulsion and the materials used in development and printing, and that the characteristics of the development and printing materials can change during the course of time and while being used. Therefore, even if the color from the chart could be relatively faithfully reproduced under certain conditions, such a reproduction would be undependable since it was subject to parameters beyond total control.

The present invention proposes to overcome the foregoing disadvantages by introducing a method for repeatedly reproducing colored surfaces having colors which correspond exactly to the shades chosen from a color chart, thereby enabling one to obtain photographic compositions which, after developing, match what the operator has chosen from a layout.

To achieve this, the method according to the invention is characterized in that, during a first phase, a sensitogram developed by means of developing materials of predetermined charactistics is recorded on a photographic emulsion of the same type, a densitometric analysis of said developed sensitigram is made, and the results of the analysis tabulated so as to establish an analytical record of the colors comprising the sensitogram with respect to the photographic emulsion and to the developing materials used, and during a second phase, the exposure conditions for the photographic emulsion are determined in order to reproduce the color selected from the color chart as a function of the data recorded on the analytical record of the colors of the sensitogram.

The apparatus for carrying out this procedure is characterized by comprising an exposure unit provided with three light sources corresponding to three primary colors, a sensitometer having a platform supporting the substrate coated with the photographic emulsion, a slide and mechanical means for the relative displacement of the slide and the substrate, a densitometer for analyzing the sensitogram, an electronic memory to record the analysis of the colors of the sensitogram and a central control unit equipped with a keyboard for selecting references from the color chart, means for calculating the length of each exposure to a primary color as a function of the information from the analytical record, and means for controlling the exposure unit.

The present invention will be better understood with reference to descriptions of the embodiment used and of its functioning, as well as to the attached drawing, in which.

Figure 1:
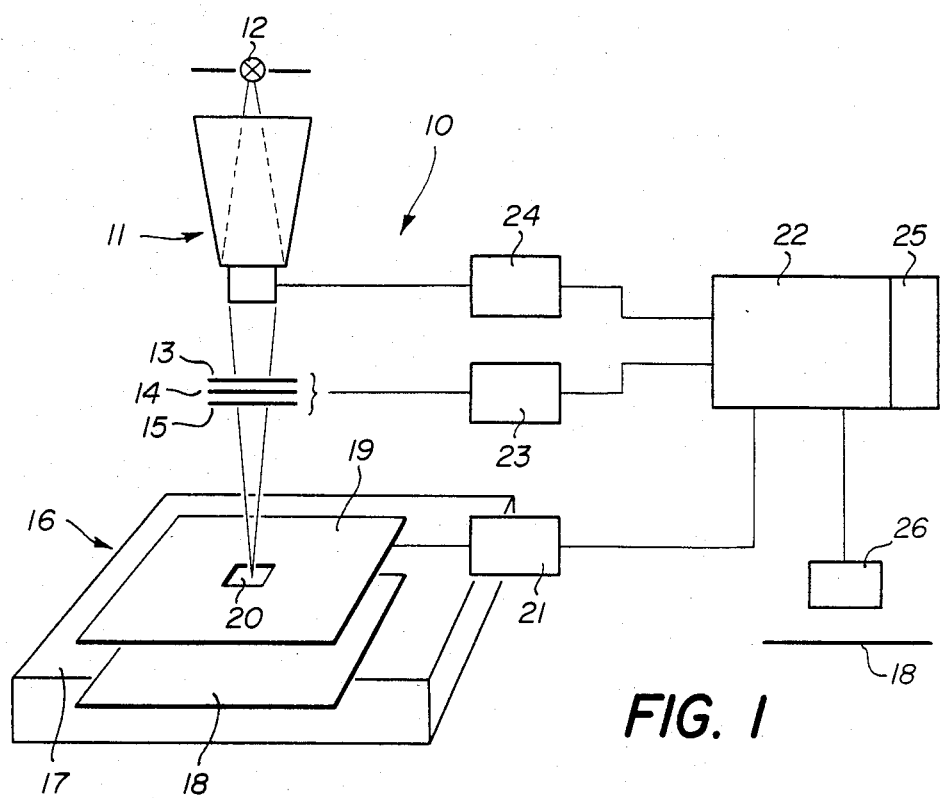
FIG. 1 is a schematic view of the apparatus according to the invention.

With reference to FIG. 1, the apparatus 10 described consists of an exposure unit 11 provided with three light sources corresponding to three primary colors. These three sources may constitute a source of white light 12 and three colored filters 13, 14, 15 corresponding to the three primary colors. They also could constitute three colored sources. The primary colors may be selected in a manner known in the art and are preferably red, green and blue, or yellow (minus blue), red-blue (minus green), and blue-green (minus red).

Furthermore, the apparatus comprises a sensitometer 16 placed beneath the exposure unit 11, said sensitometer being provided with a horizontal platform 17 to support substrate 18 coated with photographic emulsion.

According to a first embodiment, a slide 19, comprising an opaque rectangular plate in which a window 20 has been made, for example of rectangular shape, is connected to drive mechanism 21 disposed to sequentially displace the slide in relation to substrate 18.

According to another embodiment, slide 19 is fixed and platform 17 supporting substrate 18 is capable of being sequentially displaced.

In both cases, the purpose of the relative displacements taking place along two orthogonal axes is to expose successive areas of photographic emulsion across the slide so as to form the sensitogram comprised, for example, of three lines superimposed upon rectangular areas, each one of which corresponds to a lighter or darker shade of one of the primary colors. These relative displacements of the slide and of the substrate holding the emulsion are preferably controlled by central unit 22 which selects both filters 13, 14, 15 by means of drive mechanism 23, and exposure time, for example, by means of control mechanism 24 acting upon a shutter. It should be understood that the mechanical shutter may be replaced by any other appropriate means for regulating exposure time. The sensitogram obtained after developing reflects both the characteristics of the photographic emulsion and those of the developing materials, and in a sense serves as an identification card for the emulsion and developing baths.

The next phase consists of making a densitometric 26 analysis of the colors by means of a densitometer to establish an analytical record of the colors of the sensitogram with respect to the photographic emulsion and the developing materials used. The analytical index is recorded in the memory of the central control unit 22.

Figure 2:
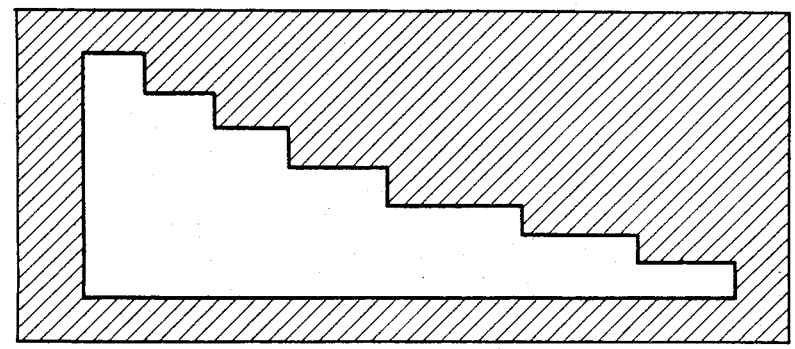
FIG. 2 is a view of one of the slides which may be used in making the sensitogram.

In another method of making the sensitogram, a slide with graduated openings such as that shown in FIG. 2 is used and is continuously displaced in relation to the substrate. This opening, being essentially shaped like a right-angled triangle, the hypotenuse of which resembles a stairway with steps of varying lengths, is used to effect at least three exposures by means of the three primary colors previously defined. It should be understood that the slide could just as well remain fixed and the substrate displaced.

To reproduce a colored surface which corresponds to a reference chosen from a color chart itself previously made on a photographic emulsion identical to that which will be used in the reproduction of the color in question, the operator feeds the references for the color chosen from the color chart into the central control unit by means of keyboard 25. This unit is programmed to determine the exposure conditions for the photographic emulsion used, while taking into account the information from the analytical index previously entered into memory. This unit is preferably disposed to effect the appropriate exposures automatically in the three primary colors to reproduce, after developing, the colored surface corresponding to the color selected from the chart.

This completely automatic apparatus could likewise be replaced by a semi-automatic apparatus, in which case the central control unit would index the necessary information so that the operator could manually control the required illuminations to reproduce the color chosen.

Furthermore, the principle described above could be applied to photographic reproductions made with solid emulsion known in the art, comprising a substrate upon which three films of solid emulsion are successively applied, each corresponding to one of the primary colors.

I claim:

1. Method for reproducing at least one colored surface, the color of which corresponds to a reference chosen from a color chart, said colored surface being obtained by controlled synthesis of colors on a given photographic emulsion, characterized by the fact that during a first stage there is recorded, on a photographic emulsion of the same type, a sensitogram developed with developing materials of predetermined characteristics, a densitometric analysis of said developed sensitogram is made and the results thereof recorded so as to establish an analytical record of the colors comprising the sensitogram respecting the photographic emulsion and the developing materials used, and by the fact that during a second stage, the exposure conditions for the photographic emulsion are determined to reproduce the color selected from the color chart as a function of the information retained in the analytical record of the colors of the sensitogram.

2. Method according to claim 1, characterized by the fact that the sensitogram is made by variable time exposure.

3. Method according to claim 1, characterized by the fact that the sensitogram is made by exposing the photographic emulsion to a light source emitting a light through an opening in a slide, corresponding to one of three primary colors, the shape of which opening corresponds to an area of the sensitogram in order to effect at least one exposure, and to attain a first area of color, and by the fact that the slide or the emulsion are sequentially displaced while varying the exposure and the choice of the light source or filter for the primary colors to attain areas of successive colors on the sensitogram.

4. Method according to claim 1, characterized by the fact that the sensitogram is made by successively exposing the photographic emulsion through an opening in a slide to a light having at least three light sources, said opening being at least approximately shaped like a right-angled triangle, the hypotenuse of which is in the form of a stairway with steps of varying lengths, each one emitting light corresponding to one of three primary colors to effect at least three successive illuminations, and by the fact that the slide is continuously relatively displaced with respect to the emulsion during each of these exposures.

5. Method according to claim 1, characterized by the fact that the results of the densitometric analysis are stored in an electronic memory unit.

6. Method according to claim 1, characterized by the fact that the color chart is made on an emulsion of the same type as that used to make the sensitogram and to reproduce the colored surface.

7. Apparatus for use with the method of claim 1, characterized by the fact that it comprises an exposure unit provided with three light sources corresponding to three primary colors, a sensitometer equipped with a platform supporting a substrate coated with photographic emulsion, a slide and mechanical means for the relative displacement of said slide and the substrate, a densitometer to analyze the sensitogram, an electronic memory to store the analytical record of the colors of the sensitogram, and a central control unit provided with a keyboard for selecting the references from the color chart, means for calculating the length of each of the exposures to a primary color as a function of the information from the analytical record, and control means for the exposure unit.

8. Apparatus according to claim 7, characterized by the fact that the slide is comprised of a plate movable in two orthoganol directions in relation to the substrate, is provided with an opening corresponding to one area of colors of the sensitogram, and by the fact that the sensitometer comprises a means governed by the central control unit to ensure the sequential displacement of said plate in one or the other of the two orthogonal directions.

9. Apparatus according to claim 7, characterized by the fact that the slide is comprised of a plate axially movable in relation to the substrate, said plate being provided with an opening having the approximate shape of a right-angled triangle, the hypotenuse of which is shaped like a stairway with steps of varying lengths, and by the fact that the sensitometer comprises a means governed by the central control unit to ensure the continuous relative displacement of the slide with respect to the emulsion.

10. Apparatus according to claim 7, characterized by the fact that the exposure unit comprises an electric light and three filters corresponding to the three primary colors, said filters being disposed to pass successively under said lamp, and a shutter means governed by the central control unit to determine the length of each exposure.

11. Apparatus according to claim 7, characterized by the fact that the exposure unit comprises three light sources each emitting a light corresponding to one of the three primary colors.

* * * * *